US008254743B2

(12) United States Patent
Sato (10) Patent No.: US 8,254,743 B2
(45) Date of Patent: Aug. 28, 2012

(54) OPTICAL FIBER CABLE HOLDER, FUSION SPLICER INCLUDING THE HOLDER, AND FUSION SPLICING METHOD USING THE HOLDER

(75) Inventor: Ryuichiro Sato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 261 days.

(21) Appl. No.: 12/752,632

(22) Filed: Apr. 1, 2010

(65) Prior Publication Data

US 2010/0260458 A1 Oct. 14, 2010

(30) Foreign Application Priority Data

Apr. 14, 2009 (JP) ................................. 2009-097615

(51) Int. Cl.
*G02B 6/00* (2006.01)

(52) U.S. Cl. .............................. 385/137; 385/96; 385/76

(58) Field of Classification Search .................... 385/76, 385/96, 134–140
See application file for complete search history.

(56) References Cited

U.S. PATENT DOCUMENTS

| | | | | |
|---|---|---|---|---|
| 6,026,210 A | * | 2/2000 | Berglund et al. | 385/137 |
| 6,099,392 A | * | 8/2000 | Wiegand et al. | 451/41 |
| 6,377,743 B1 | * | 4/2002 | Ueda et al. | 385/137 |
| 6,816,662 B2 | * | 11/2004 | Doss et al. | 385/134 |
| 6,960,034 B2 | | 11/2005 | Brugger et al. | |
| 7,412,146 B2 | * | 8/2008 | Sato et al. | 385/134 |
| 7,546,020 B2 | * | 6/2009 | Honma | 385/137 |
| 7,811,006 B2 | * | 10/2010 | Milette et al. | 385/76 |
| D628,462 S | * | 12/2010 | Sato | D8/356 |
| 8,043,013 B2 | * | 10/2011 | Lichoulas et al. | 385/99 |
| 2003/0123836 A1 | * | 7/2003 | Fujisawa et al. | 385/137 |
| 2008/0181563 A1 | | 7/2008 | Akiyama | |

FOREIGN PATENT DOCUMENTS

| | | |
|---|---|---|
| JP | 11-023883 A | 1/1999 |
| JP | 11-231164 A | 8/1999 |
| JP | 2003-532132 A | 10/2003 |
| JP | 2005-249922 A | 9/2005 |
| JP | 2006-235199 A | 9/2006 |
| JP | 2007-171825 A | 7/2007 |
| JP | 2007-298705 A | 11/2007 |
| JP | 2008-151952 A | 3/2008 |
| JP | 2008-292523 A | 4/2008 |
| WO | WO-01/77728 A | 10/2001 |

OTHER PUBLICATIONS

Notification of Reasons for Rejection of the corresponding Japanese Application No. 2009-097615, dated Feb. 8, 2011. Bibliographic data of WO 01/77728.
Günther Mahlke et al., "Fiber Optic Cables: Fundamentals Cable Design System Planning", 2001, pp. 112-115, 4th revised and enlarged edition, Publicis MCD Corporate Publishing.
European Search report of corresponding European Application No. 10159934.8-2216/2241914, dated Jul. 21, 2011.

* cited by examiner

*Primary Examiner* — Ellen Kim
(74) *Attorney, Agent, or Firm* — Global IP Counselors, LLP

(57) ABSTRACT

A holder capable of holding an optical fiber cable without breaking or damaging the cable includes a holder main body, a fiber holding portion, and a cable holding portion. The main body has a groove for receiving the optical fiber exposed from the cable sheath at an end part of the cable, and a portion for receiving the end part of the cable sheath. A positioning surface with which an end surface of the cable sheath can come in contact is provided at the boundary between the fiber receiving groove and the cable receiving part. A fiber holding portion for pressing and holding the optical fiber received by the fiber receiving groove, and a cable holding portion for pressing and holding the cable sheath received by the cable receiving part, are configured so that holding by the cable holding portion is released in conjunction with the release of holding by the fiber holding portion.

11 Claims, 7 Drawing Sheets

OPTICAL FIBER CABLE HOLDER, FUSION SPLICER INCLUDING THE HOLDER, AND FUSION SPLICING METHOD USING THE HOLDER

BACKGROUND OF THE INVENTION

1. Field of the Invention

The present invention relates to an optical fiber cable holder, to a fusion splicer that includes the holder, and to a fusion splicing method that uses the holder.

2. Description of the Related Art

Japanese Laid-open Patent Publication No. 11-23883 discloses an optical fiber holder comprising a main body and a cover body that can be opened and closed with respect to the main body, wherein the main body has an alignment groove on the surface that faces the cover body along the axial direction of the optical fiber, and when the cover body is closed, it exposes both end parts of the alignment groove to the outside and clamps the optical fiber with the alignment groove to align and support the optical fiber. Japanese Laid-open Patent Publication No. 2006-235199 discloses an optical fiber holder having a base part provided with a long groove part for receiving the optical fiber; and a cover part for pressing the optical fiber, the cover part being provided to the base part; wherein the long groove part is provided with a groove part whose cross-section is in the shape of at least two V characters.

SUMMARY OF THE INVENTION

An object of the present invention is to provide a holder suitable for holding an optical fiber cable such as a loose buffer in which an optical fiber can move in the axial direction with respect to a cable sheath, the holder being capable of holding the optical fiber cable without breakage, damage, or other adverse effects on the optical fiber cable; and to provide a fusion splicer that includes the holder, and a fusion splicing method that uses the holder.

In order to achieve these objects, there is provided a holder for holding an optical fiber cable that includes a cable sheath and an optical fiber. The holder comprises a holder main body, a fiber holding portion, and a cable holding portion. The holder main body has a fiber receiving groove being dimensioned to receive an exposed end portion of the optical fiber extending from the cable sheath and a cable receiving part being dimensioned to receive a portion of the cable sheath. A positioning surface is arranged to contact an end surface of the cable sheath, the positioning surface being located between the fiber receiving groove and the cable receiving part of the holder main body. A fiber holding portion is configured and arranged to selectively move between an open position and a closed position such that in the open position the fiber receiving groove is exposed and in the closed position the fiber receiving groove is at least partially covered such that the fiber holding portion presses and holds the optical fiber with the optical fiber positioned in the fiber receiving groove. A cable holding portion is configured and arranged to selectively move between an open position and a closed position such that in the open position the cable receiving part is exposed and in the closed position the cable receiving part is at least partially concealed such that the cable holding portion presses and holds the cable sheath with the cable sheath positioned in the cable receiving part, wherein movement of the cable holding portion from the open position to the closed position causes the fiber holding portion to move to the closed position.

Another aspect of the present invention provides a fusion splicer for fusion splicing optical fibers of optical fiber cables that include a cable sheath and an optical fiber, and the fusion splicer comprises the holder of the present invention as a first holder for holding end parts of the optical fiber cables. In the fusion splicer of the present invention, the first holder may be detachable. Moreover, in the fusion splicer of the present invention, a heater may be provided for heat-shrinking a heat-shrinkable tube covering the fusion-spliced part of the optical fibers, and the holder of the present invention may also be provided as a second holder for holding the end parts of the optical fiber cables and placing the fusion-spliced part in the heater. Alternatively in the fusion splicer of the present invention, a heater may be provided for heat-shrinking a heat-shrinking tube covering the fusion-spliced part of the optical fibers, and a holder installation part may be provided for the first holder which holds the end parts of the optical fiber cables such that the fusion-spliced part is placed in the heater.

Another aspect of the present invention provides a fusion splicing method comprising holding end parts of optical fiber cables to be connected to each other with the aid of the holder of the present invention, and placing optical fibers exposed from cable sheaths of the optical fiber cables end to end and heat fusing the optical fibers to each other.

According to the holder of the present invention, since the optical fiber cables are held not only at the optical fibers but also at the cable sheath portion, the end parts of the optical fiber cables can be securely held without breakage, damage, or other adverse effects on the optical fibers. Placing the end surfaces of the cable sheaths in contact with the positioning surface enables the optical fiber cables to be easily positioned with respect to the holder main body. The fusion splicer of the present invention makes it possible to easily and satisfactorily fusion-splice optical fibers to each other. Through the fusion splicing method of the present invention, fusion splicing can be facilitated, and the quality of the splice can be increased.

DESCRIPTION OF THE PREFERRED EMBODIMENTS

The abovementioned features and other features, aspects, and advantages of the present invention will be better understood through the following description, appended claims, and accompanying drawings. In the explanation of the drawings, an identical mark is applied to identical elements and an overlapping explanation will be omitted.

A holder of the present invention is for holding the end parts of optical fiber cables. A loose buffer will be described herein as an example of an optical fiber cable.

Figure 1:
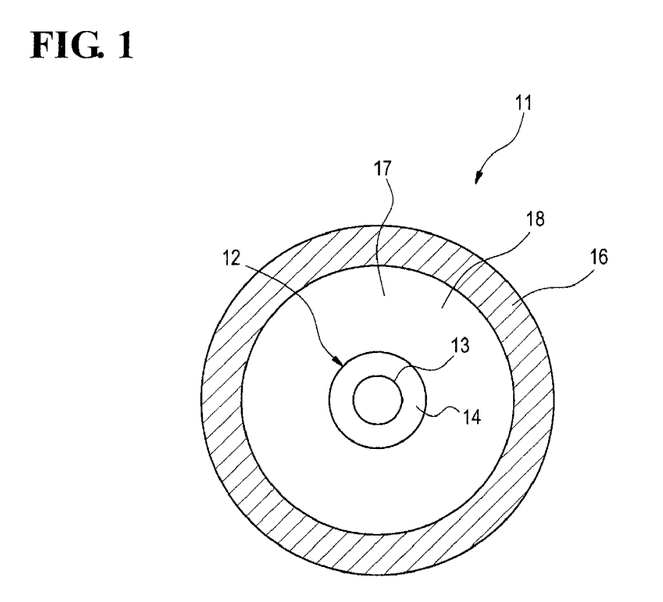
FIG. 1 is a sectional view showing a loose buffer as an example of an optical fiber cable.

FIG. 1 is a sectional view showing a loose buffer 11 as an example of an optical fiber cable. The loose buffer 11 is provided with an optical fiber 12 and a cable sheath (buffer tube) 16 for covering the external periphery of the optical fiber 12. The optical fiber 12 has a structure in which the periphery of a bare glass fiber 13 is covered by a fiber coating 14. The inside diameter of the buffer tube 16 is larger than the diameter of the optical fiber 12, and a free space 17 is formed between the optical fiber 12 and the buffer tube 16. The free space 17 is filled with a filling material 18. (The filling material 18 may be omitted.)

Figure 2:
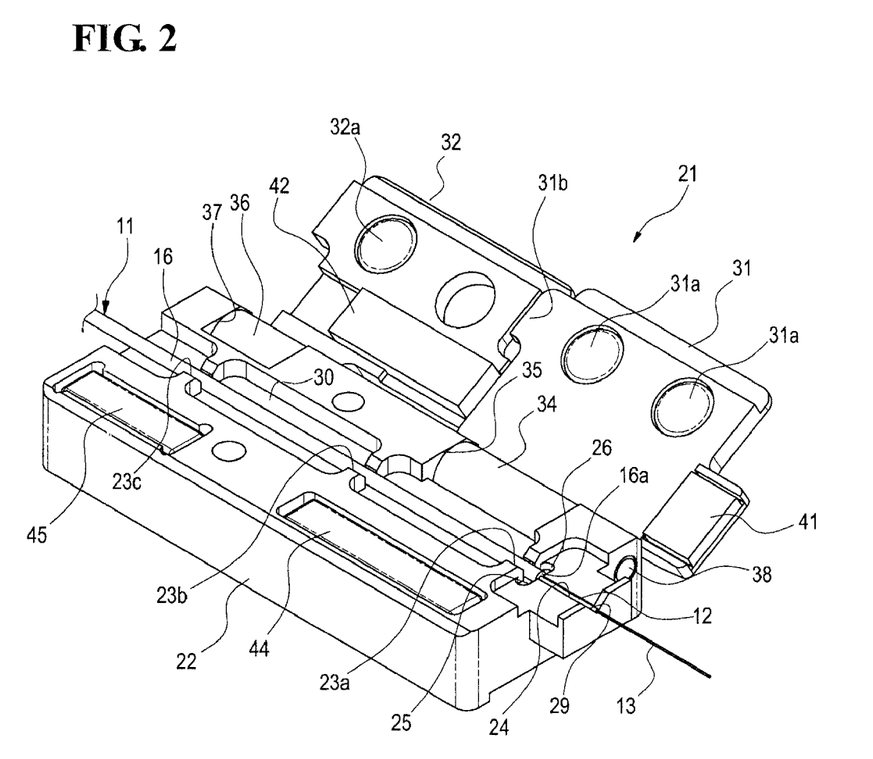
FIG. 2 is a perspective view showing a holder according to an embodiment of the present invention with the cover open.
Figure 3A:
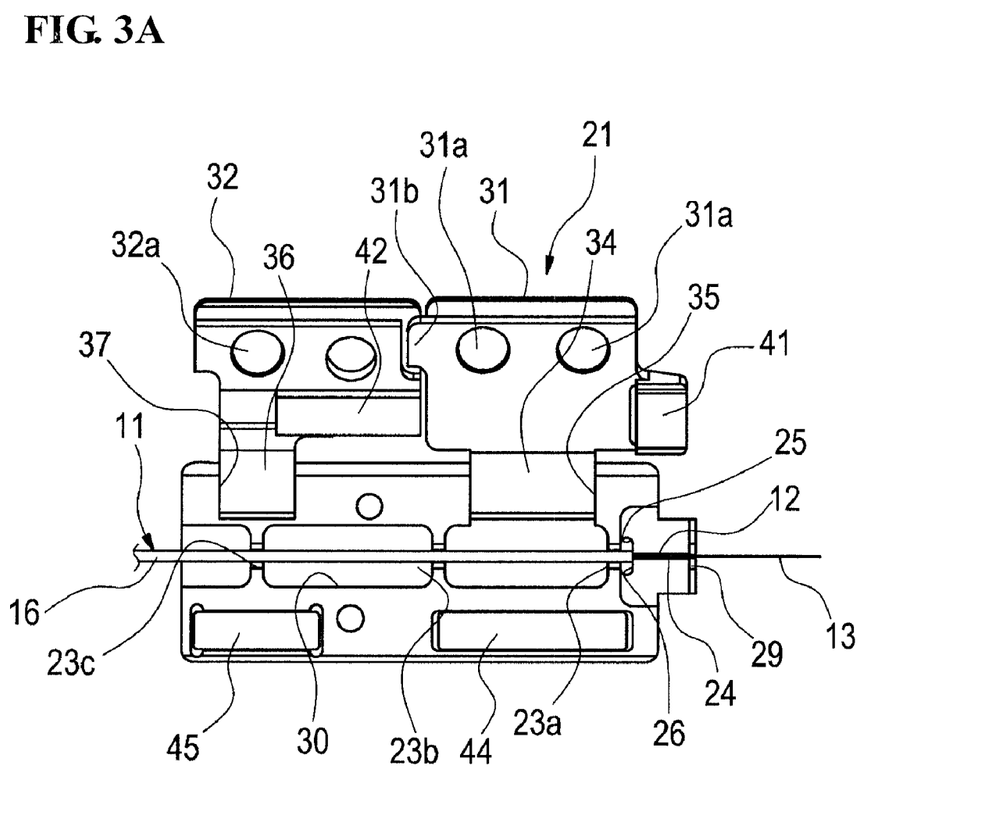
FIGS. 3A, 3B, 3C, and 3D are a plan view, a side view from one end of the holder, a front view, and a side view from the other end of the holder, respectively, which show the holder of FIG. 2.
Figure 3B:
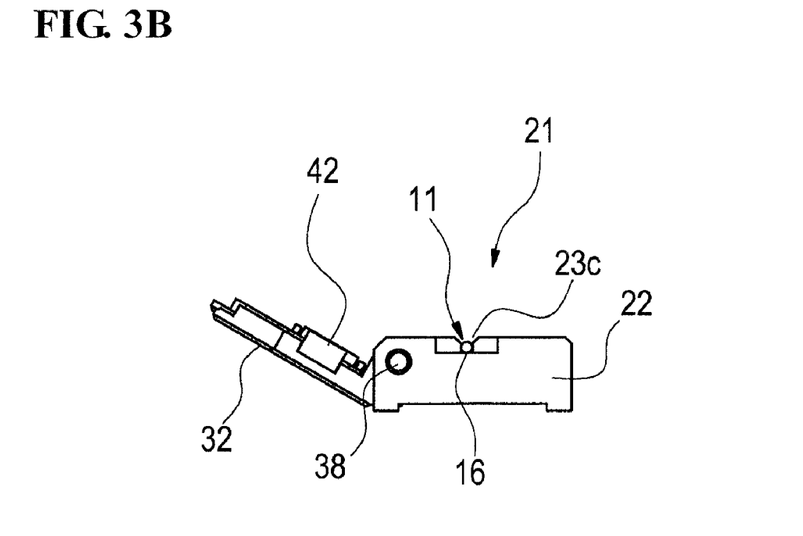
Figure 3C:
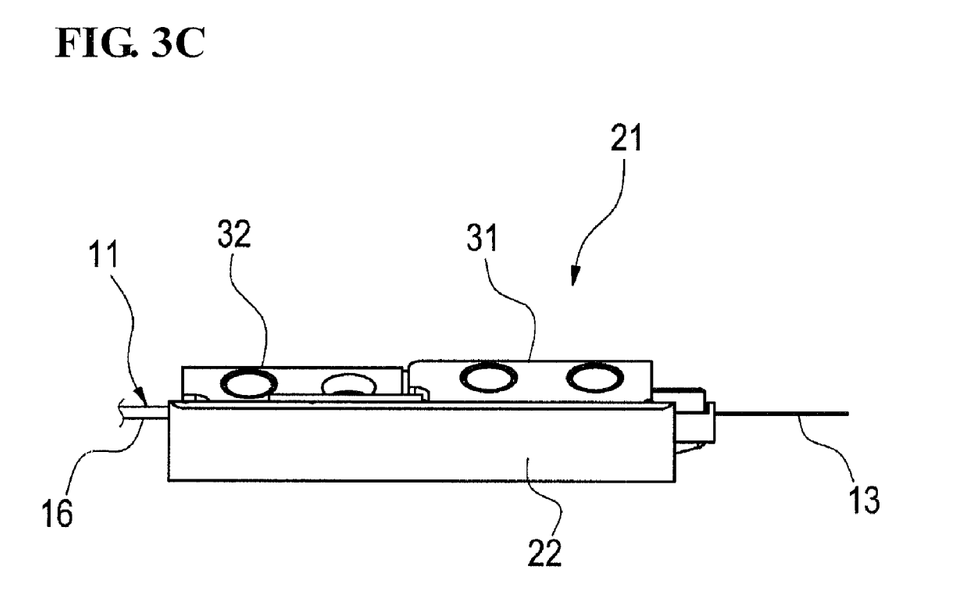
Figure 3D:
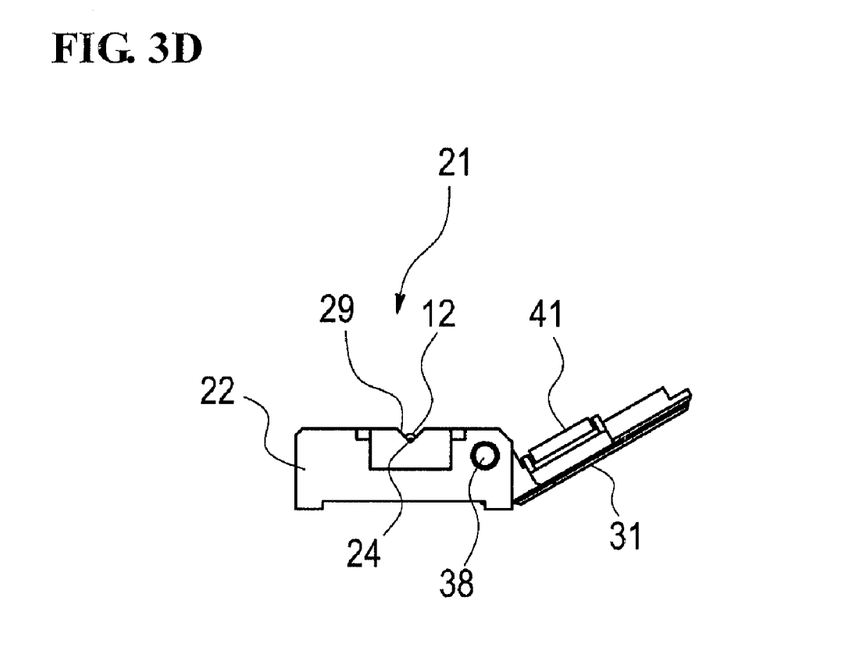
Figure 4:
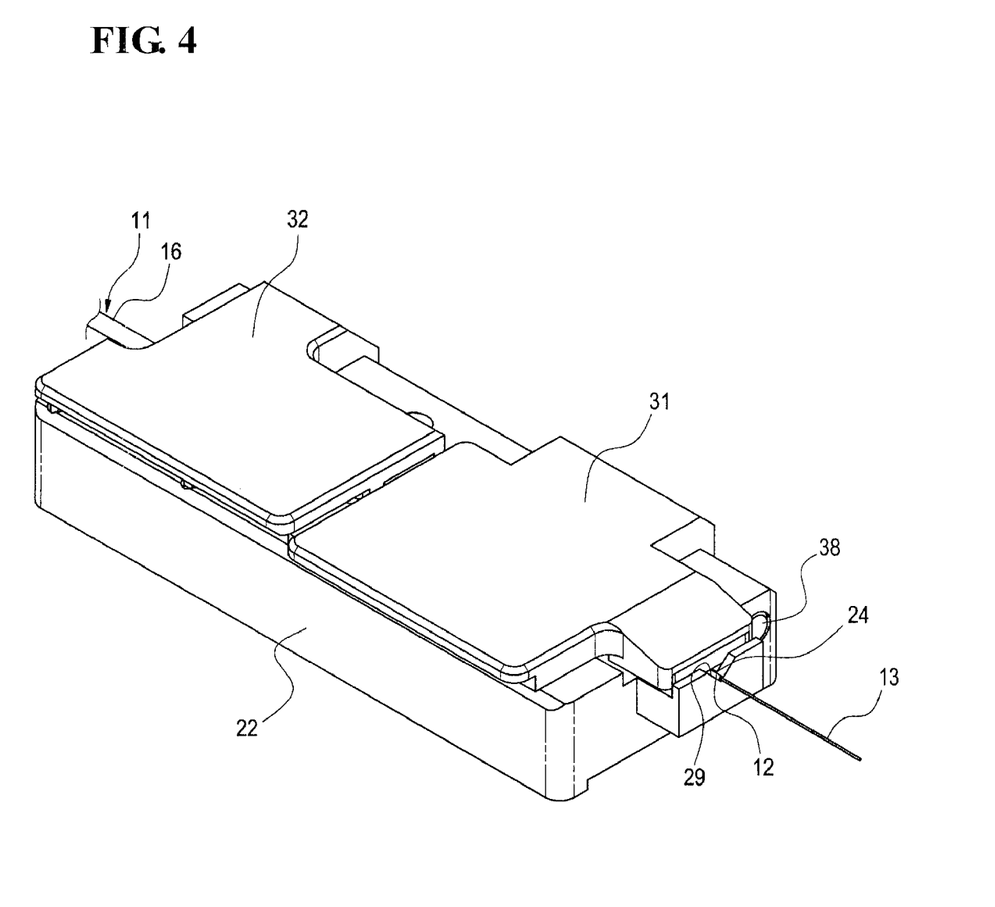
FIG. 4 is a perspective view showing a holder according to an embodiment of the present invention with the cover closed.
Figure 5A:
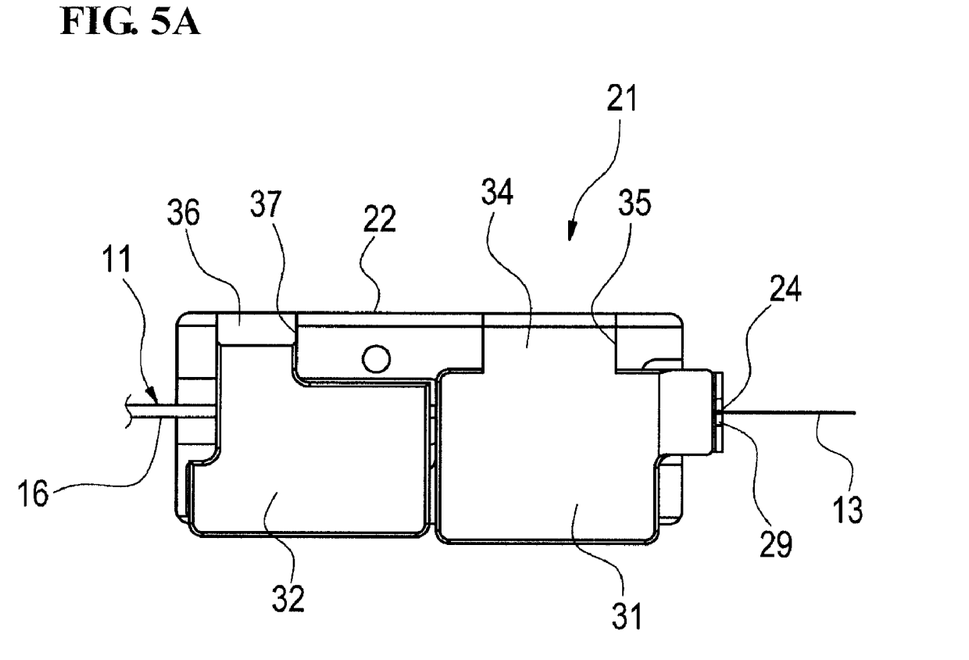
FIGS. 5A, 5B, 5C, and 5D are a plan view, a side view from one end of the holder, a front view, and a side view from the other end of the holder, respectively, and which show the holder of FIG. 4.
Figure 5B:
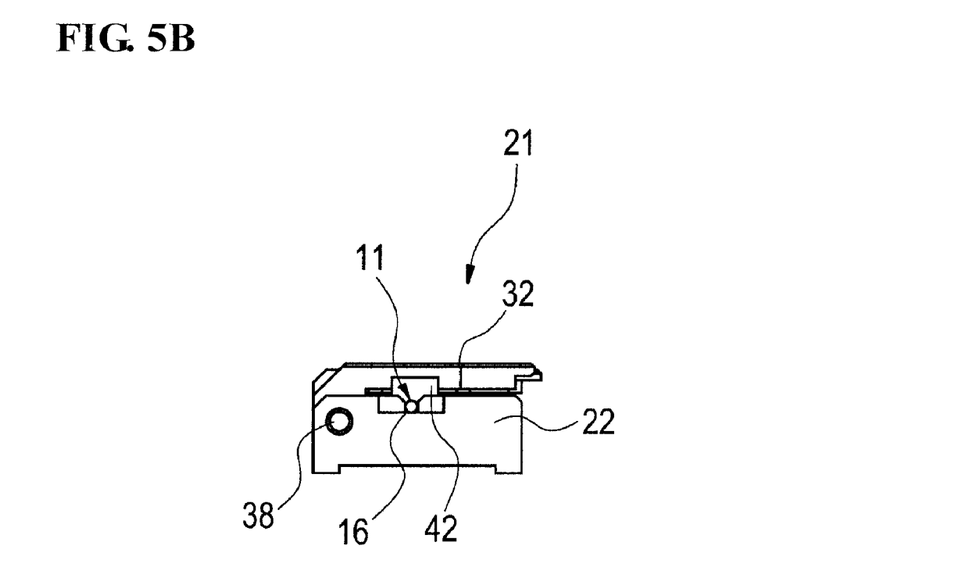
Figure 5C:
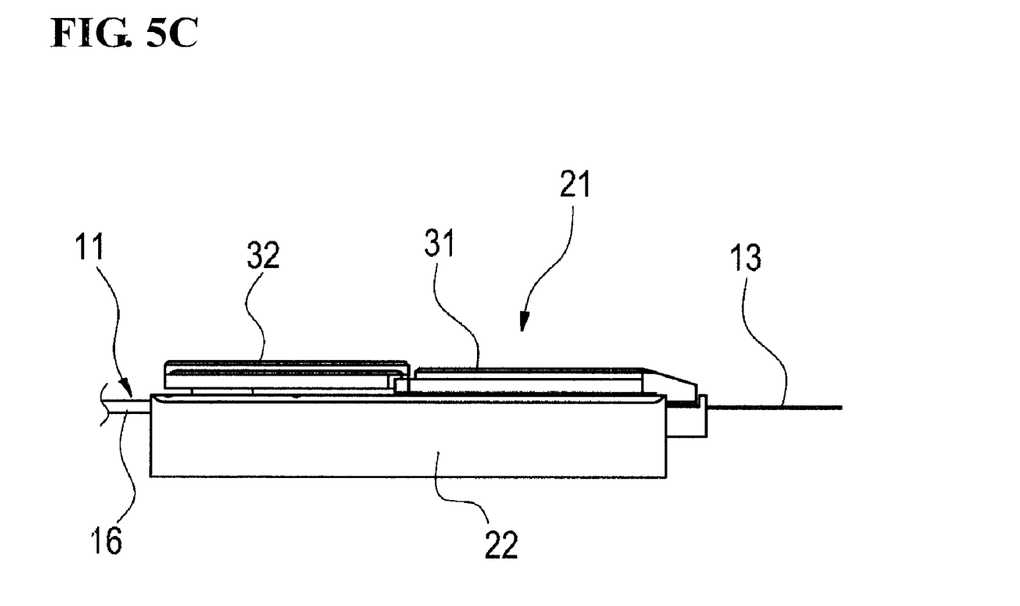
Figure 5D:
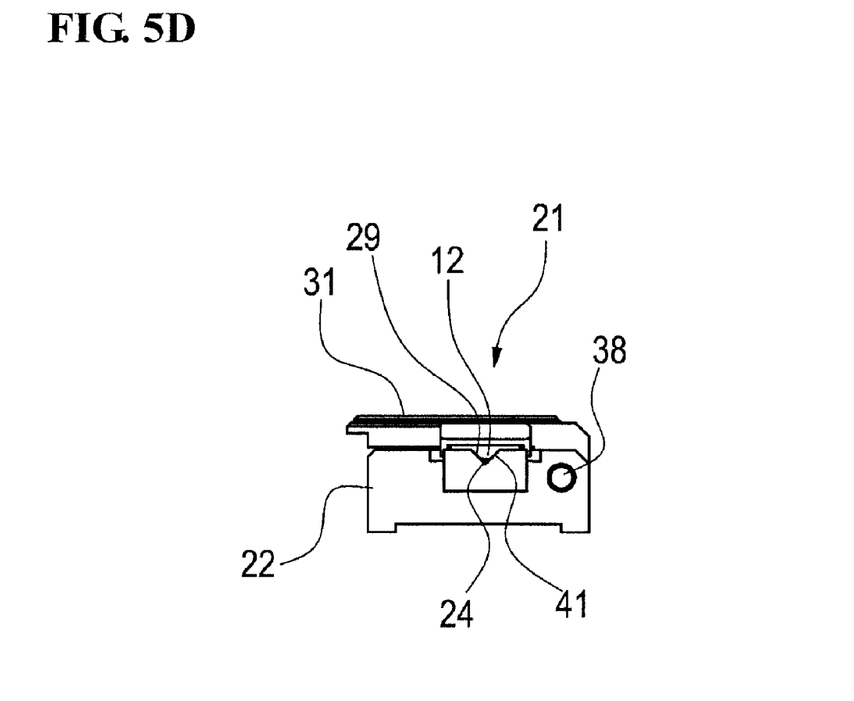

FIG. 2 is a perspective view showing a holder 21 according to an embodiment of the present invention with the cover open; and FIGS. 3A, 3B, 3C, and 3D are a plan view showing the holder of FIG. 2, a side view from one end of the holder, a front view, and a side view from the other end of the holder, respectively. FIG. 4 is a perspective view showing the holder 21 with the cover closed; and FIGS. 5A, 5B, 5C, and 5D are a plan view showing the holder of FIG. 4, a side view from one end of the holder, a front view, and a side view from the other end of the holder, respectively. The optical fiber 12 is exposed from the buffer tube 16 at the end part of the loose buffer 11 held by the holder 21. A terminal treatment is performed on the optical fiber 12 to remove the fiber coating 14 and expose the bare glass fiber 13.

The holder 21 holding the end part of the loose buffer 11 that has been terminal treated in this manner has a holder main body 22, a fiber holding portion (fiber holding cover) 31, and a cable holding portion (cable holding cover) 32. A plurality of cable receiving parts 23a, 23b, and 23c for receiving the buffer tube 16 of the loose buffer 11 is arranged in the axial direction on the top surface of the main body 22. A fiber receiving groove 24 for receiving the optical fiber 12 drawn out from the end part of the loose buffer 11 is formed on the top surface of the main body 22. A positioning surface 25 is provided between the fiber receiving groove 24 and the cable receiving part 23a on the side of the fiber receiving groove 24, and an end surface 16a of the buffer tube 16 received by the cable receiving parts 23a, 23b, 23c is placed against the positioning surface 25. A clearance groove 26 is formed on the periphery of the positioning surface 25. A V-shaped guide groove 29 extending upward from the fiber receiving groove 24 is formed at the end of the main body 22.

The fiber holding cover 31 and cable holding cover 32 are connected on one side of the main body 22. The fiber holding cover 31 and the cable holding cover 32 have a hinge part 34 and a hinge part 36, respectively, and are connected so as to be able to rotate with respect to the main body 22 around a connecting pin 38 that passes through the hinge part 34 and hinge part 36. The fiber holding cover 31 is positioned so as to cover the top part of the fiber receiving groove 24 and the cable receiving part 23a on the side of the fiber receiving groove 24 by being rotated toward the top surface of the main body 22. The cable holding cover 32 is positioned so as to cover the top part between the other cable receiving parts 23b, 23c by being rotated toward the top surface of the main body 22. The fiber holding cover 31 and the cable holding cover 32 are formed from iron or another magnetic material, and are provided with magnets 31a, 32a.

A presser panel 41 composed of rubber or another elastic material is provided to the surface of the fiber holding cover 31 that faces the main body 22. Rotating the fiber holding cover 31 toward the top surface of the main body 22 places the presser panel 41 over the fiber receiving groove 24. A presser panel 42 composed of rubber or another elastic material is provided to the surface of the cable holding cover 32 that faces the main body 22. Rotating the cable holding cover 32 toward the top surface of the main body 22 causes the presser panel 42 to enter into a concave part 30 formed between the cable receiving parts 23b, 23c.

Magnets 44, 45 are provided on the top surface of the main body 22 on the side thereof opposite the side on which the fiber holding cover 31 and cable holding cover 32 are connected. When the fiber holding cover 31 and cable holding cover 32 are placed on the top surface of the main body 22, the fiber holding cover 31 and cable holding cover 32 are held against the main body 22 by the magnetic force of the magnet 44 and magnet 45, and the loose buffer 11 are held at the optical fiber 12 and buffer tube 16.

An engaging part 31b is formed at the end of the fiber holding cover 31 on the side toward the cable holding cover 32. The engaging part 31b overlaps with the cable holding cover 32 in the thickness direction, and is positioned at the main body 22 side of the cable holding cover 32.

In order to be held by the holder 21, the loose buffer 11 is first subjected to a terminal treatment. Specifically, about 30 mm of the buffer tube 16 at the end part of the loose buffer 11 is removed to expose the optical fiber 12. The fiber coating 14 of the optical fiber 12 is then removed from the end part of the buffer tube 16, leaving 5 to 10 mm thereof, and the bare glass fiber 13 is exposed, after which the bare glass fiber 13 is cut to a length of 10 mm. The bare glass fiber 13 thereby extends for 10 mm at the end part, followed inward for 5 to 10 mm by the optical fiber 12 coated by the fiber coating 14, and then followed inward by the buffer tube 16.

The loose buffer 11 subjected to terminal treatment in this manner is then received by the main body 22. Specifically, the buffer tube 16 is received by the cable receiving parts 23a, 23b, 23c, and the optical fiber 12 is received by the fiber receiving groove 24. At this time, the optical fiber 12 is smoothly guided into the fiber receiving groove 24 by the guide groove 29 and received. The loose buffer 11 is furthermore moved in the direction of the end part, and the end surface 16a of the buffer tube 16 is placed against the positioning surface 25. The terminal-treated loose buffer 11 is thereby received in a state of being positioned with respect to the main body 22.

Barr or the like sometimes remains at the edge of the end surface 16a when the buffer tube 16 is cut. However, when the end surface 16a of the buffer tube 16 is placed against the positioning surface 25, the burr formed on the end surface 16a can enter the clearance groove 26 on the periphery of the positioning surface 25. The loose buffer 11 can thus be received by the main body 22 without being affected by the burr formed on the end surface 16a of the buffer tube 16.

Once the loose buffer 11 has been received by the main body 22, the fiber holding cover 31 and cable holding cover 32 are each rotated closed. The optical fiber 12 portion is thereby retained and held by the presser panel 41 of the fiber holding cover 31. The buffer tube 16 is also retained and held between the cable receiving parts 23b, 23c by the presser panel 42 of the cable holding cover 32 entering into the concave part 30. The holder 21 can thus securely hold the loose buffer 11 not only at the optical fiber 12 portion but also at the buffer tube 16.

The loose buffer 11 can be removed from the holder 21 after fusion splicing, by rotating the fiber holding cover 31 and cable holding cover 32 to open the top surface of the main body 22. In the holder 21, as the fiber holding cover 31 is opened and holding of the optical fiber 12 is released, the engaging part causes the cable holding cover 32 to open, and the holding at the buffer tube 16 is released in conjunction. The optical fiber 12 is therefore prevented from slipping out of the buffer tube 16 when the loose buffer 11 is removed from the holder 21 after fusion splicing. (When the optical fiber 12 is released first in a state in which the buffer tube 16 is held by the cable holding cover 32, since the optical fiber is being held in a holder for holding the other loose buffer cable that is to be fusion spliced, the optical fiber 12 is sometimes pulled, and slips out from the buffer tube 16.)

Figure 6:
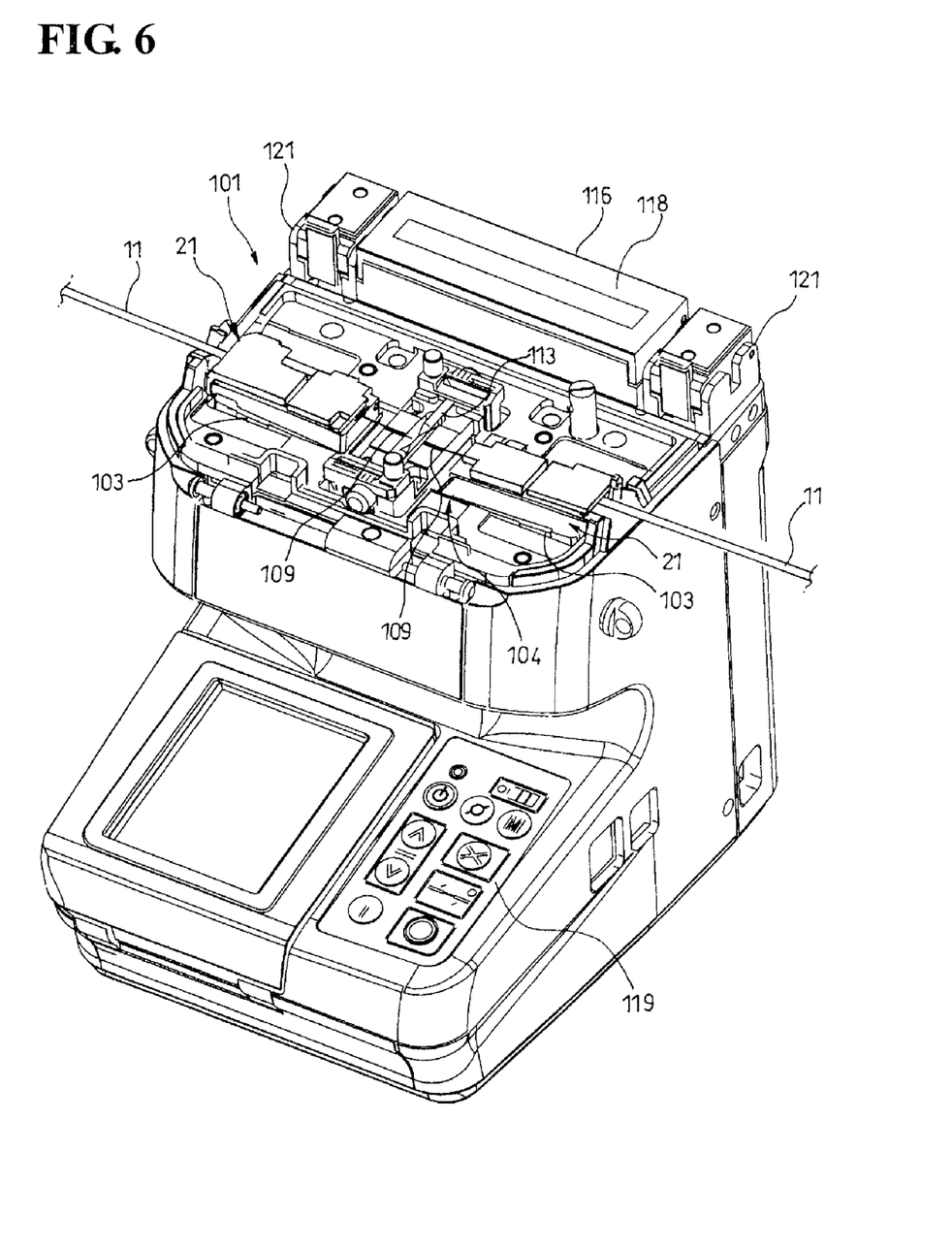
FIG. 6 is a perspective view showing a fusion splicer according to an embodiment of the present invention.

FIG. 6 is a perspective view showing a fusion splicer. The fusion splicer 101 is a device for fusion splicing optical fibers 12 of loose buffers 11 in a plant or at a site at which work is being performed on optical fiber equipment. The fusion splicer 101 is provided with a fusion processing unit 104 equipped with a pair of holder installation parts 103 to which holders 21 holding the end parts of loose buffers 11 are detachably attached. By installing the holders 21 in the holder installation parts 103, the optical fibers 12 of the loose buffers 11 held by each of the holders 21 are placed in the fusion position. Symmetrically structured holders 21 are installed in the holder installation parts 103.

The fusion processing unit 104 is provided with a pair of V-groove members 109 and an electrode 113 positioned between the pair of V-groove members 109. The pair of V-groove members 109 position the distal ends of the optical fibers 12 that extend from each of the holders 21 installed in the holder installation parts 103. The electrode 113, by electric discharge, fuses the end surfaces of the bare glass fibers 13 of the optical fibers 12 that are placed end-to-end. In the fusion processing unit 104, the bare glass fiber 13 portions of the optical fibers 12 placed at the fusion position are heat-fused and spliced together.

The holders 21 may be installed in the holder installation parts 103 in advance. In this case, terminal-treated loose buffers 11 are held by the holders 21 that are installed in the holder installation parts 103. The fusion splicer 101 is also provided with a cover (not shown) capable of covering the fusion processing unit 104.

Moreover, the fusion splicer 101 is provided with a heat-shrink processing unit 116 for heat-shrinking, with the aid of a heater, a heat-shrink tube (not shown) placed on the external periphery of the fusion-spliced part of the optical fibers 12. The heat-shrink processing unit 116 is provided adjacent to the fusion processing unit 104, and is provided with a dedicated cover 118.

Holder installation parts 121 to which a holder 21 is detachably attached are provided to the heat-shrink processing unit 116 as well. By installing holders 21 in the holder installation parts 121, the fusion-spliced part of the optical fibers 12 is placed in position in the heat-shrink processing unit 116. (Dedicated holders other than the holder 21 may also be provided instead of the holder installation parts 121.)

The heat-shrink processing unit 116 is equipped with a heater (not shown) for heat-shrinking a heat-shrink tube. In the heat-shrink processing unit 116, the heater gives a temperature profile such that the center part of the heat-shrink tube first shrinks, and the end parts shrink afterwards. Air bubbles that form within the heat-shrink tube during heating can thereby easily escape from both end parts. The fusion splicer 101 is also provided with an operating unit 119 for actuating the fusion processing unit 104 and the heat-shrink processing unit 116.

A method for fusion splicing the optical fibers 12 of loose buffers 11 will next be described. The loose buffers 11 to be spliced are first subjected to terminal treatment, and the optical fibers 12 and bare glass fibers 13 are exposed.

The terminal portions of the loose buffers 11 are then held by the holders 21 (see FIGS. 2 through 5). At this time, a heat-shrink tube is placed on any one of the loose buffers 11. Once the loose buffers 11 are held by the holders 21, the bare glass fibers 13 are cut in a cutter to a predetermined length and the end surfaces thereof are finished, and each holder 21 is installed in a holder installation part 103 of the fusion splicer 101 (see FIG. 6).

In this arrangement, the bare glass fibers 13 of the optical fibers 12 extending from the holders 21 are positioned by the V-groove members 109 of the fusion processing unit 104, and the end parts of the bare glass fibers 13 are placed end-to-end in the position of fusion by the electrode 113. In this state, by operating the operating unit 119 of the fusion splicer 101, an electric discharge is issued by the electrode 113, and the end surfaces of the bare glass fibers 13 of the optical fibers 12 are fusion spliced together. The fiber holding cover 31 and cable holding cover 32 of each holder 21 are then opened to remove the loose buffer 11. Since the fiber holding cover 31 and the cable holding cover 32 are opened simultaneously, the optical fiber 12 can be prevented from slipping out of the buffer tube 16. Since the optical fibers 12 are also fusion spliced while being held by the holders 21 not only at the optical fibers 12, but also at the buffer tubes 16, the optical fiber 12, which is not resistant to tensile strain, can be fusion spliced without breakage, damage, or other adverse effects.

The fusion-spliced part is then reinforced. Specifically, a reinforced member (not shown) is provided to the fusion-spliced part, and the fusion-spliced part is covered by a heat-shrink tube. The cover 118 of the heat-shrink processing unit 116 is then opened, and the loose buffers 11 are held in the respective holders 21 of the heat-shrink processing unit 116. The loose buffers 11 are thereby held by the holders 21 not only at the optical fibers 12, but also at the buffer tubes 16, and the fusion-spliced part of the optical fiber 12 covered by the heat-shrink tube is placed in position in the heat-shrink processing unit 116.

Operating the operating unit 119 of the fusion splicer 101 in this state activates the heater, which heats and shrinks the heat-shrink tube. The fusion-spliced part of the optical fiber 12 of the loose buffer 11 is thereby reinforced with a reinforced portion covered by the sealed heat-shrink tube.

As described above, by using the holder 21, since the optical fiber cable (loose buffer) 11 is held by the fiber holding cover 31 and the cable holding cover 32, not only at the optical fiber 12, but also at the cable sheath (buffer tube) 16, the end part of the optical fiber cable 11 can be securely held without breakage, damage, or other adverse effects on the optical fiber 12. Since holding of the cable sheath 16 by the cable holding cover 32 is released as holding of the optical fiber 12 by the fiber holding cover 31 is released, the optical fiber can be prevented from slipping out from the cable sheath (buffer tube 16) even when a loose buffer 11 is held.

Since the positioning surface 25 against which the end surface 16a of the buffer tube 16 is placed is present at the boundary between the fiber receiving groove 24 and the cable receiving parts 23a, 23b, 23c, the loose buffer 11 can be easily positioned with respect to the main body 22 by placing the end surface 16a of the buffer tube 16 against the positioning surface 25.

The holders 21 in the fusion splicer according to the present embodiment make it possible to smoothly and satisfactorily fusion-splice the optical fibers 12 to each other. Particularly if the holders 21 are detachable, the holders 21 can be installed in the fusion splicer 101 after the end parts of the loose buffers 11 have been secured in the holders 21, and working efficiency can be enhanced.

Moreover, since the fusion splicer 101 is configured to have holder installation parts into which the holder of the present invention can be placed in the heat-shrink processing unit 116 as well, the optical fiber cables 11 can be easily and securely held with respect to the heat-shrink processing unit 116, and the fusion-spliced part can be positioned in the heater. The working efficiency of the heat-shrink processing unit 116 can thereby be enhanced as well.

According to the fusion splicing method of the present embodiment, since the optical fibers 12 are fusion-spliced to each other in a state in which the loose buffers 11 are held by the holders 21, fusion splicing can be facilitated, and the quality of the splice can be increased. Even in the case of a loose buffer cable in which the optical fiber 12 is accommodated in the buffer tube 16 such that it is able to move in the axial direction, since the buffer tube 16 is held by the holder 21, the buffer tube 16 is satisfactorily positioned with respect to the reinforced member provided to the fusion-spliced part, and satisfactory integration by the heat-shrink tube can be obtained.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

For example, the optical fiber cable is not limited to a loose buffer cable, and the present invention can also be applied to optical fibers of optical fiber cords having a round cross-section or optical drop cables having a rectangular cross-section. Even in a case in which an optical fiber having no cable sheath are held, the holder 21 can hold the optical fiber by placing the optical fiber in the fiber receiving groove 24 and closing the fiber holding cover 31. A configuration of the fusion splicer 101 was described above in which the holders 21 are detachable, but the holders 21 may also be integrally fixed to the fusion splicer 101.

What is claimed is:

1. A holder for holding an optical fiber cable that includes a cable sheath and an optical fiber, comprising:
    a holder main body having a cable receiving part and a fiber receiving groove, the cable receiving part being dimensioned to receive a portion of the cable sheath, and the fiber receiving groove being dimensioned to receive an exposed end portion of the optical fiber extending from the cable sheath;
    a positioning surface arranged to contact an end surface of the cable sheath, the positioning surface being located between the fiber receiving groove and the cable receiving part of the holder main body;
    a fiber holding cover connected to the holder main body for pivotal movement with respect thereto, the fiber holding cover being configured and arranged to selectively move between an open position and a closed position relative to the holder main body such that in the open position the fiber receiving groove is exposed and in the closed position the fiber receiving groove is at least partially covered such that the fiber holding cover presses and holds the optical fiber with the optical fiber positioned in the fiber receiving groove; and
    a cable holding cover connected to the holder main body for pivotal movement with respect thereto, the cable holding cover being configured and arranged to selectively move between an open position and a closed position relative to the holder main body such that in the open position the cable receiving part is exposed and in the closed position the cable receiving part is at least partially concealed such that the cable holding cover presses and holds the cable sheath with the cable sheath positioned in the cable receiving part, wherein movement of the cable holding cover from the open position to the closed position causes the fiber holding cover to move to the closed position.

2. A fusion splicer for fusion splicing optical fibers of optical fiber cables that include a cable sheath and an optical fiber, the fusion splicer comprising
    the holder according to claim 1 as a first holder for holding end parts of the optical fiber cables.

3. The fusion splicer according to claim 2, wherein the first holder is detachable.

4. The fusion splicer according to claim 2; the fusion splicer further comprising:
    a heater for heat-shrinking a heat-shrink tube covering the fusion-spliced part of the optical fibers; and
    the holder according to claim 1 as a second holder for holding the end parts of the optical fiber cables and placing the fusion-spliced part in the heater.

5. The fusion splicer according to claim 2; the fusion splicer further comprising:
    a heater for heat-shrinking a heat-shrink tube covering the fusion-spliced part of the optical fibers; and
    a holder installation part for the first holder holding the end parts of the optical fiber cables such that the fusion-spliced part is placed in the heater.

6. A fusion splicing method comprising:
    holding end parts of optical fiber cables to be connected to each other with the aid of the holder according to claim 1; and
    placing optical fibers exposed from cable sheaths of the optical fiber cables end to end, and heat-fusing the optical fibers to each other.

7. The holder as set forth in claim 1, wherein
    the fiber holding cover includes an engaging part that extends to the cable holding cover such that with the fiber holding cover and the cable holding cover both in their closed position, the engaging part extends under the cable holding cover, and such that movement of the fiber holding cover from the closed position to the open position causes the cable holding cover to move to the open position.

8. The holder as set forth in claim 1, wherein
    the holder main body is provided with at least one magnet and at least one of the fiber holding cover and the cable holding cover includes a magnet such that when the at least one of the fiber holding cover and the cable holding cover is in the closed position, the magnet in the holder main body retains the at least one of the fiber holding cover and the cable holding cover in the closed position.

9. The holder as set forth in claim 1, wherein
    the fiber holding cover is supported to the holder main body by a first hinge, and
    the cable holding cover is supported to the holder main body by a second hinge.

10. The holder as set forth in claim 9, wherein
    the first hinge and the second hinge are aligned along a common rotation axis located along one side of the holder main body.

11. The holder as set forth in claim 9, wherein
    the fiber holding cover includes an engaging part that extends to the cable holding cover such that with the fiber holding cover and the cable holding cover both in their closed position, the engaging part extends under the cable holding cover, and such that movement of the fiber holding cover from the closed position to the open position causes the cable holding cover to move to the open position.

* * * * *